(12) United States Patent
Marhafer et al.

(10) Patent No.: US 7,483,852 B2
(45) Date of Patent: Jan. 27, 2009

(54) TOTAL VALUE BIDDING

(75) Inventors: David Marhafer, Pittsburgh, PA (US); Keith Miller, Gibsonia, PA (US); Dan McIlnay, Apollo, PA (US); David Clevenger, Pittsburgh, PA (US)

(73) Assignee: Ariba, Inc., Sunnyvale, CA (US)

( * ) Notice: Subject to any disclaimer, the term of this patent is extended or adjusted under 35 U.S.C. 154(b) by 1297 days.

(21) Appl. No.: 10/131,326

(22) Filed: Apr. 24, 2002

(65) Prior Publication Data

US 2003/0204465 A1 Oct. 30, 2003

(51) Int. Cl.
G06Q 40/00 (2006.01)

(52) U.S. Cl. .......................................... 705/37; 705/35

(58) Field of Classification Search .................... 705/35, 705/37
See application file for complete search history.

(56) References Cited

U.S. PATENT DOCUMENTS

| | | | |
|---|---|---|---|
| 3,581,072 A | 5/1971 | Nymeyer | |
| 3,863,060 A | 1/1975 | Rode et al. | |
| 4,597,045 A | 6/1986 | Kiuchi | |
| 4,674,044 A | 6/1987 | Kalmus et al. | |
| 4,789,928 A | 12/1988 | Fujisaki | |
| 4,799,156 A | 1/1989 | Shavit et al. | |
| 4,845,625 A | 7/1989 | Stannard | |
| 4,992,940 A | 2/1991 | Dworkin | |
| 5,136,501 A | 8/1992 | Silverman et al. | |
| 5,193,056 A | 3/1993 | Boes | |
| 5,243,515 A | 9/1993 | Lee | |
| 5,297,032 A | 3/1994 | Trojan et al. | |
| 5,375,055 A | 12/1994 | Togher et al. | |
| 5,394,324 A | 2/1995 | Clearwater | |
| 5,402,336 A | 3/1995 | Spiegelhoff et al. | |
| 5,606,602 A | 2/1997 | Johnson et al. | |
| 5,629,982 A | 5/1997 | Micali | |
| 5,640,569 A | 6/1997 | Miller et al. | |

(Continued)

FOREIGN PATENT DOCUMENTS

EP 0399850 A 11/1990

(Continued)

OTHER PUBLICATIONS

Teich et al. "Designing Electronic Auctions: An Internet-Based Hybrid Procedure Combining Aspects of Negotiations and Auctions". Electronic Commerce Research, 1: 301-314 (2001).*

(Continued)

Primary Examiner—Lalita M Hamilton
(74) Attorney, Agent, or Firm—Van Pelt, Yi & James LLP

(57) ABSTRACT

A method and system of evaluating values of different payment or delivery terms in online auctions, including obtaining an interest rate and a period from a buyer for a lot, the lot having a predetermined value, receiving a first bid from a first bidder and a second bid from a second bidder on the lot, the first and second bids each having a payment time and a rebate and transforming the first bid into a first value and the second bid into a second value using the interest rate, the period, and the predetermined value from the buyer, and the payment times and rebates from the first and second bidders.

19 Claims, 4 Drawing Sheets

U.S. PATENT DOCUMENTS

| | | |
|---|---|---|
| 5,664,115 A | 9/1997 | Fraser |
| 5,684,963 A | 11/1997 | Clement |
| 5,689,652 A | 11/1997 | Lupien et al. |
| 5,715,402 A | 2/1998 | Popolo |
| 5,727,165 A | 3/1998 | Ordish et al. |
| 5,758,327 A | 5/1998 | Gardner et al. |
| 5,758,328 A | 5/1998 | Giovannoli |
| 5,765,138 A | 6/1998 | Aycock et al. |
| 5,774,873 A | 6/1998 | Berent et al. |
| 5,794,207 A | 8/1998 | Walker et al. |
| 5,794,219 A | 8/1998 | Brown |
| 5,797,127 A | 8/1998 | Walker et al. |
| 5,799,151 A | 8/1998 | Hoffer |
| 5,799,285 A | 8/1998 | Klingman |
| 5,802,502 A | 9/1998 | Gell et al. |
| 5,803,500 A | 9/1998 | Mossberg |
| 5,809,483 A | 9/1998 | Broka et al. |
| 5,826,244 A | 10/1998 | Huberman |
| 5,832,496 A | 11/1998 | Anand et al. |
| 5,835,896 A | 11/1998 | Fisher et al. |
| 5,862,223 A | 1/1999 | Walker et al. |
| 5,890,138 A | 3/1999 | Godin et al. |
| 5,897,621 A | 4/1999 | Boesch et al. |
| 5,905,974 A | 5/1999 | Fraser et al. |
| 5,905,975 A | 5/1999 | Ausubel |
| 5,915,209 A | 6/1999 | Lawrence |
| 5,966,699 A | 10/1999 | Zandi |
| 6,014,627 A | 1/2000 | Togher et al. |
| 6,021,398 A | 2/2000 | Ausubel |
| 6,023,685 A | 2/2000 | Brett et al. |
| 6,044,363 A | 3/2000 | Mori et al. |
| 6,055,518 A | 4/2000 | Franklin et al. |
| 6,058,379 A | 5/2000 | Odom et al. |
| 6,061,663 A | 5/2000 | Bloom et al. |
| 6,078,906 A | 6/2000 | Huberman |
| 6,119,229 A | 9/2000 | Martinez et al. |
| 6,151,589 A | 11/2000 | Aggarwal et al. |
| 6,161,099 A | 12/2000 | Harrington et al. |
| 6,199,050 B1 | 3/2001 | Alaia et al. |
| 6,266,652 B1 | 7/2001 | Godin et al. |
| 6,275,807 B1 | 8/2001 | Schirripa |
| 6,366,891 B1 | 4/2002 | Feinberg |
| 2001/0032167 A1* | 10/2001 | Tulloch et al. ............... 705/37 |

FOREIGN PATENT DOCUMENTS

| | | |
|---|---|---|
| JP | 409101994 A | 4/1997 |
| JP | 410078992 A | 3/1998 |
| WO | WO 92/15174 | 9/1992 |
| WO | WO 97/37315 | 10/1997 |
| WO | WO 98/34187 | 8/1998 |
| WO | WO 99/63461 | 12/1999 |

OTHER PUBLICATIONS

Lumpur, Kuala. Collective Juice's Reverse Auction Formula. New Straits Times. Apr. 5, 2000. p. 6.*

Hoesel van Stan and Muller, Rudolf. "Optimization in Electronic Markets: Examples in Combinatorial Auctions". Netnomics. 3: 23-33. 2001.*

Andrews, "Auctions Catch the Interest of Hobbyists and Big Business", Aug. 24, 1998.

Associated Press, "Auction on Web is Buyer's Market", Apr. 6, 1998.

"BroadVision Developing First Interactive Commerce Management System To Support Online Sales & Marketing Process; New Software Category Necessary to Interactive Network Architecture", Business Wire, p. 5150152, May 15, 1995.

Danny Cohen, "Computerized Commerce", Information Processing 89, Aug. 28-Sep. 1, 1989.

"FairMarket Launches New Self-Serve Auctions", Business Wire, p. 6161495, Jun. 16, 1998.

Jahnke, "How Bazaar", CIO Web Business Magazine, Aug. 27, 1998.

Jean-Pierre Banatre, et al., "The Design and Building of Enchere, a Distributed Electronic Marketing System" Communications of the ACM, No. 1, Jan. 29, 1986.

Lee, "Do electronic marketplaces lower the price of goods?", Communications of the PCM, v41n1 pp. 73-80, Jan. 1998.

Malone, et al., "The Logic of Electronic Markets", Harvard Business Review, No. 893II, May-Jun. 1989.

"Moai Technologies Introduces New categories of Business Auction Software . . . ", Business Editors and Computer Writers, Mar. 16, 1998.

Kikuchi, et al., "Multi-Round Anonymous Auction Protocols", IEICE Trans. Inf. & Syst., vol. E82-D, No. 4, Apr. 1999.

"Online bidding software", Electronic Buyers' News, Issue 1072, p. 86, 1/6p, Aug. 25, 1997.

Sairamesh, et al., "Economic Framework for Pricing and Charging Digital Libraries", D-Lip Magazine, Feb. 1996.

"Sold! . . . To the Lowest Bidder", Computer Finance, v6, n2, Jul. 1995.

"Venture Capitalists Fund Two Massachusetts Internet Related Companies", Boston Globe, Jan. 14, 1998.

Vigoroso, "Buyers prepare for brave new world of e-commerce", Purchasing, v126, n6, p. S4(1), Apr. 22, 1999.

Von der Fehr, et al., "Predatory bidding in sequential auctions", Oxford Economics Papers, v46, n3, p. 345(12), Jul. 1994.

"What you need to know to bid in FCC's narrowband auction", Washington Telecom News, v2, n26, p. 6(2), Jun. 27, 1994.

Wilder, "What's Your Bid?—FreeMarkets' real-time online bidding technology lets clients drive downcosts and improve product value", Information Week, Nov. 10, 1997.

Woolley, "E-muscle", Forbes, Mar. 9, 1998.

M. Reck, "Types of Electronic Auctions", Hochschule St. Gallen.

C. Wrigley, "Design Criteria For Electronic Market Servers", Electronic Markets, vol. 7, No. 4, 1997.

Wurman, et al., "The Michigan Internet AuctionBot: A Configurable Auction Server for Human and Software Agents", Artificial Intelligence Laboratory, University of Michigan, 1998.

* cited by examiner

TOTAL VALUE BIDDING

FIELD OF THE INVENTION

The invention relates generally to conducting online electronic auctions, and in particular, to determining adjustment values in online bidding.

BACKGROUND OF THE INVENTION

Procurement Models

It is believed that procurement of goods and services has traditionally involved high transaction costs. The cost of finding and qualifying potential bidders has been particularly high. The advent of electronic commerce has introduced new methods of procurement that lower some of the transaction costs associated with procurement. Electronic procurement, and in particular business-to-business electronic procurement, matches buyers and suppliers and facilitates transactions that take place on networked processors.

Supplier-bidding auctions for products and services defined by a buyer have been developed. In a supplier-bidding auction, bid prices may start low and move upward or start high and move downward in reverse-auction format, as suppliers interact to establish a closing price. The auction marketplace is often one-sided, i.e., one buyer and many potential suppliers. It is believed that, typically, the products being purchased are components or materials. "Components" may mean fabricated tangible pieces or parts that become part of assemblies of durable products. Example components include gears, bearings, appliance shelves, or door handles. "Materials" may mean bulk quantities of raw materials that are further transformed into product. Example materials include corn syrup or sheet steel.

Industrial buyers may not purchase one component at a time. Rather, they may purchase whole families of similar components. These items may therefore be grouped into a single lot. Suppliers in industrial auctions may provide unit price quotes for all line items in a lot.

Auction Process

In many types of business transactions, price may not be the sole parameter upon which a decision is made. For example, in the negotiations for a supply contract, a buyer may compare various proposals not only on the basis of price but also on the basis of the non-price characteristics of non-standard goods, such as the location of the supplier, payment, delivery terms, the reputation of the supplier, etc. In a typical business-to-business situation, a plurality of parameters may be considered in combination with the supplier's price proposal.

In these situations, purchasers may negotiate with each supplier independently because multi-parameter bids may not be readily compared. Actual comparisons by the purchaser may be based on a combination of subjective and objective weighting functions. Bidders may not have access to information on the buyer-defined weighting functions. At most, bidders may be selectively informed (at their disadvantage) of aspects of other competing bids. The limited communication of information between bidders may limit the potential of true competition between the bidders. The absence of competition may lower the likelihood that the bidders approach their true walk-away bid. Further, the manual weighting process may be time consuming and subject to inconsistency from one application to the next.

SUMMARY OF THE INVENTION

The invention provides a method for evaluating values of different terms in online auctions. This method includes obtaining an interest rate and a period from a buyer for a lot, having a predetermined value, receiving a first bid, having a payment time and a rebate, from a first bidder and a second bid, having a payment time and a rebate, from a second bidder on the lot, and transforming the first bid into a first value and the second bid into a second value using the interest rate, the period, and the price from the buyer, and the payment times and rebates from the first and second bidders.

The invention provides another method for evaluating values of different terms in online auctions. This method includes obtaining an interest rate (i) and payment period (e) from a buyer for lots, receiving bids from bidders, generating an adder (b) and a factor (m) for each bid, transforming the adders (b), factors (m), and rebates (x) into values (y), and ranking the values (y). Each lot has a price (n), and each bid has a payment time (p) and the rebate (x).

The invention also provides another method of evaluating values of different payment terms in online auctions. This method includes obtaining an interest rate (i) and payment period (e) from a buyer for a lot, soliciting bids from bidders, receiving the bids from the bidders, where the bids have a payment time (p) and a rebate (x), calculating a factor (m), generating adders (b) for each bid, determining the values (y), and ranking the values (y). The lot has a price (n), and the factor (m) is defined by:

$$m = n/(1+i)^e \qquad (1)$$

wherein t is a time in which the rebate will be paid. The adder (b) is defined by equations (2) and (3):

$$b = \frac{\sum_{q=1}^{g} b_q}{(1+i)^{(r+e)}} \qquad (2)$$

wherein:

$$b_q = \frac{n/g * i * f}{(1+i)^{(z_q+f)}}, \qquad (3)$$

q is 1 to g time periods, g is a number of time periods, r is total time units in a time period, f is (p−e), and $z_q$ is total time units from 0 to q. The value (y) is defined by equation (4):

$$y = (m*x) + b. \qquad (4)$$

The invention also provides a system for evaluating values of different terms in online auctions. This system includes a database for receiving and storing an interest rate and a period from a buyer for lots and bids on the lots from bidders, and software for generating an adder and a factor for each bid and transforming the adders, factors and rebates into values. Each bid has a payment time and the rebate, and the lots have a predetermined value.

The invention further provides a machine readable medium evaluating values of different terms in online auctions. This machine readable medium includes a first machine readable code that receives and stores an interest rate and a period from a buyer for lots, a second machine readable code that receives bids from bidders, a third readable code that generates an adder and a factor for each bid, and a fourth readable code that transforms the adders, factors and rebates into values. Each lot has a predetermined value and each bid has a payment time and a rebate.

BRIEF DESCRIPTION OF THE DRAWINGS

The accompanying drawings, which are incorporated herein and constitute a part of this specification, illustrate the presently preferred embodiments of the invention and, together with the general description given above and the detailed description given below, serve to explain the features of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks.

The invention provides a method of evaluating values of different terms, including payment terms and delivery schedules, in online auctions. The invention is designed to create a market of competition in business transactions that traditionally could not take advantage of natural auction dynamics. The method is particularly applicable to online auctions where bidders submit bids to an auction coordinator electronically during the auction process. The method allows real-time evaluation of bids that include different payment terms and rebates. The buyer may choose the best bid for his particular situation.

The following description of the features of the present invention is presented in the context of an upward-based online auction. However, as would be appreciated by one of ordinary skill in the relevant art, these inventive features could also be applied in the context of downward-based online auctions as well.

Figure 1A:
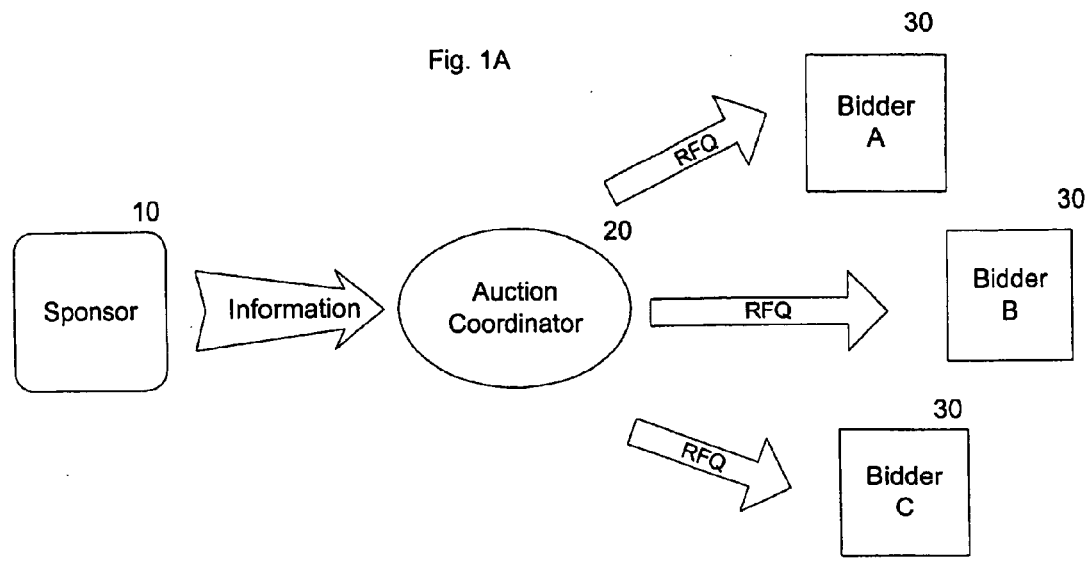
FIG. 1A is a flow diagram of a request for quotation in an auction.

The basic process for a purchaser sponsored supplier-bidding as conducted by the assignee of the present invention, is described below with reference to FIG. 1. FIG. 1 illustrates the functional elements and entities involved in setting up and conducting a typical supplier-bidding auction. FIG. 1A illustrates the creation of an auctioning event, FIG. 1B illustrates the bidding during an auction, and FIG. 1C illustrates results after completion of a successful auction.

In the supplier-bidding total value auction model, the product or service to be purchased is, preferably, defined by the sponsor, or originator, 10 of the auction, as shown in FIG. 1A. Alternatively, the buyer may set up all or some of its own bidding events and find its own suppliers. In that case, the sponsor 10 would run the events through a market operations center, which is a facility where auctions are monitored and participants receive assistance. If the sponsor 10 decides to use the auctioning system of the present invention to procure products or services, the sponsor 10 may provide information to an auction coordinator 20. That information may include information about incumbent suppliers and historic prices paid for the products or services to be auctioned, for example. Preferably, the sponsor 10 also works with the auction coordinator 20 to define the products and services to be purchased in the auction and lot the products and services appropriately so that desired products and services can be procured using optimal auction dynamics. A specification may then be prepared for each desired product or service, and a Request for Quotation ("RFQ") may be generated for the auction.

Next, the auction coordinator 20 may identify potential suppliers 30, preferably with input from the sponsor 10, and invite the potential suppliers 30 to participate in the upcoming auction. The suppliers 30 that are selected to participate in the auction may become bidders 30 and may be given access to the RFQ, typically through an RFQ in a tangible form, such as on paper or in an electronic format.

Figure 1B:
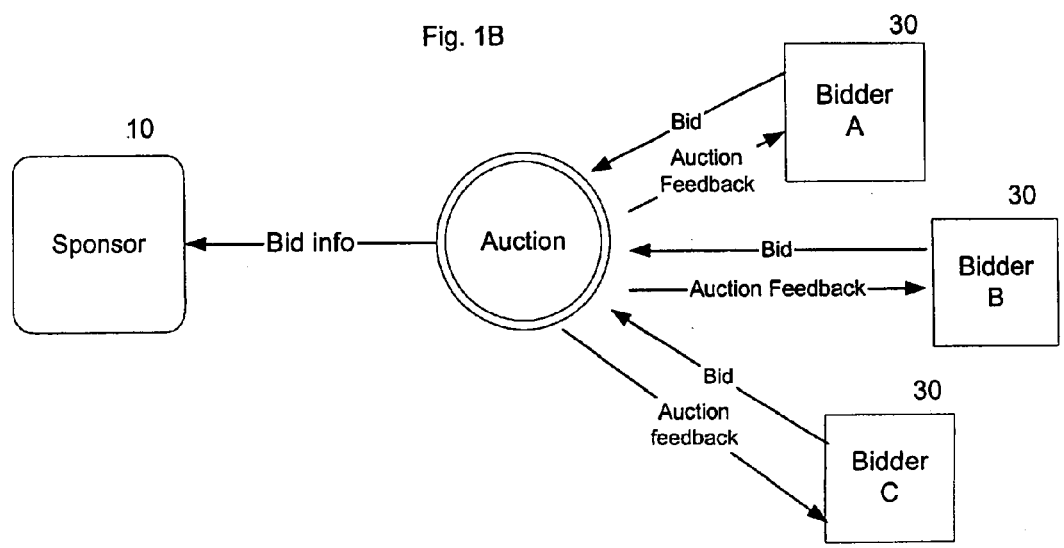
FIG. 1B is a flow diagram of a bidding process in an auction.
Figure 1C:
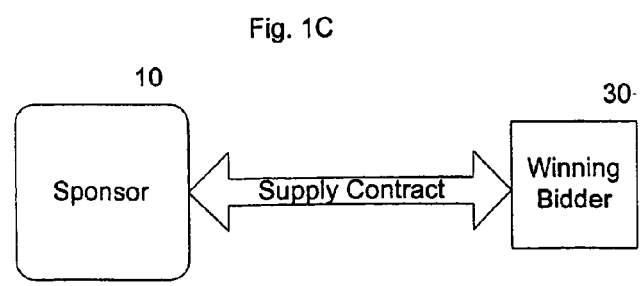
FIG. 1C is a flow diagram of a contract award following an auction.

As shown in FIG. 1B, during a typical auction, bids are made for lots. Bidders 30 may submit actual unit prices for all line items within a lot, however, the competition in an auction is typically based on the aggregate value bid for all line items within a lot. The aggregate value bid for a lot may, therefore, depend on the level and mix of line item bids and the quantity of goods or services that are offered for each line item. Thus, bidders 30 submitting bids at the line item level may actually be competing on the lot level. During the auction, the sponsor 10 may typically monitor the bidding as it occurs. Bidders 30 may also be given market feedback during the auction so that they may bid competitively.

After the auction, the auction coordinator 20 may analyze the auction results with the sponsor 10. The sponsor 10 may conduct final qualification of the low bidding supplier or suppliers 30. The sponsor 10 may furthermore retain the right not to award business to a low bidding supplier 30 based on final qualification or other business concerns. As shown in FIG. 1C, a supply contract may be drawn up for the winning bidder 30 and executed based on the results of the auction.

The auction may be conducted electronically between bidders 30 at their respective remote sites and the auction coordinator 20 at its site. Alternatively, instead of the auction coordinator 20 managing the auction at its site, the sponsor 10 may perform auction coordinator tasks at its site.

Figure 2:
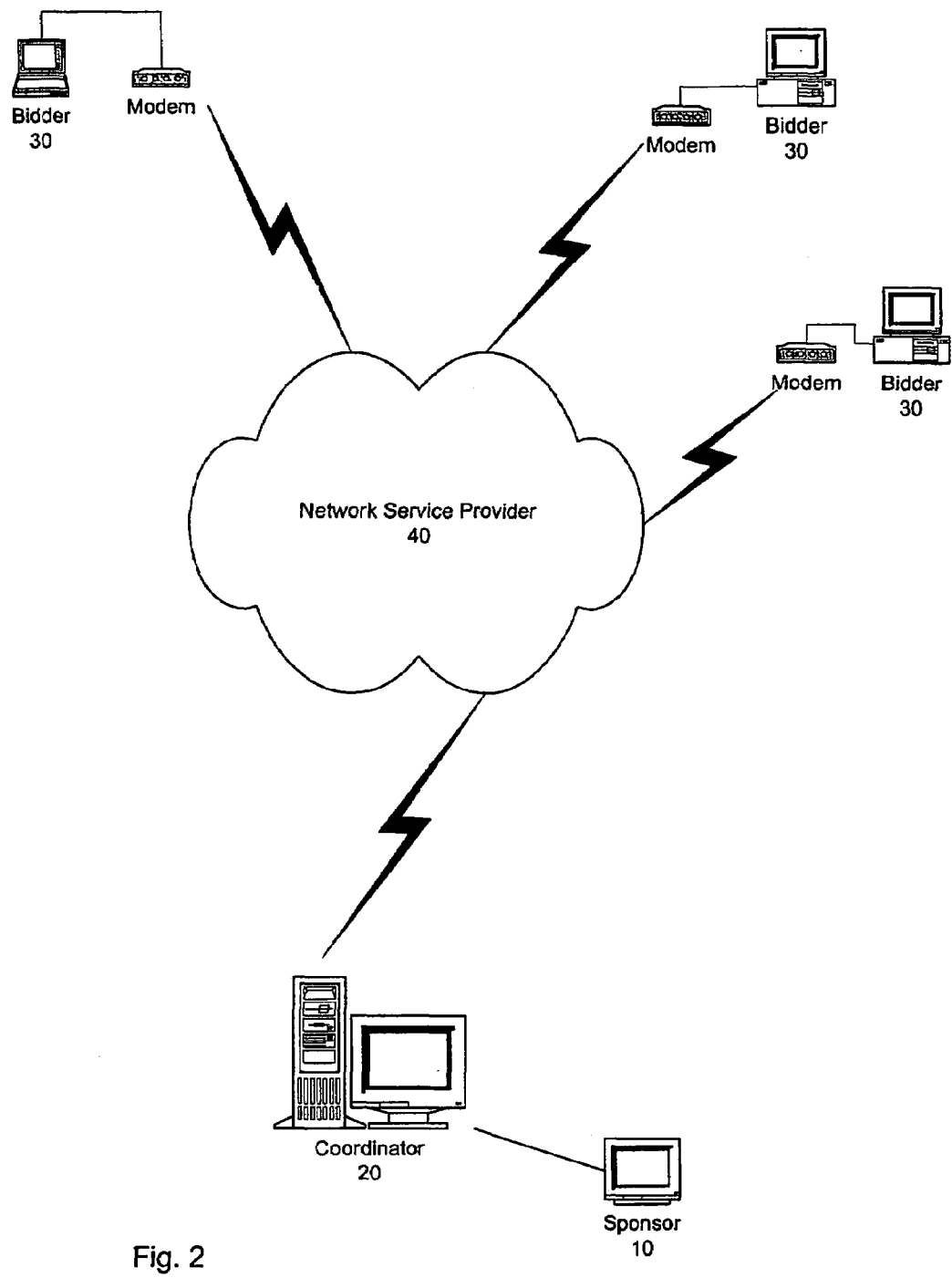
FIG. 2 is a schematic illustration of communications links between the coordinator, the buyer, and the suppliers in an auction.

Information may be conveyed between the coordinator 20 and the bidders 30 via any communications medium. As shown in FIG. 2, bidders 30 may be connected to the auction through the Internet via a network service provider 40 accessed, for example, through a dial-up telephone connections. Alternatively, sponsors 10 and bidders 30 may be coupled to the auction by communicating directly with the auction coordinator 20 through a public switched telephone network, a wireless network, or any other connection.

Figure 3:
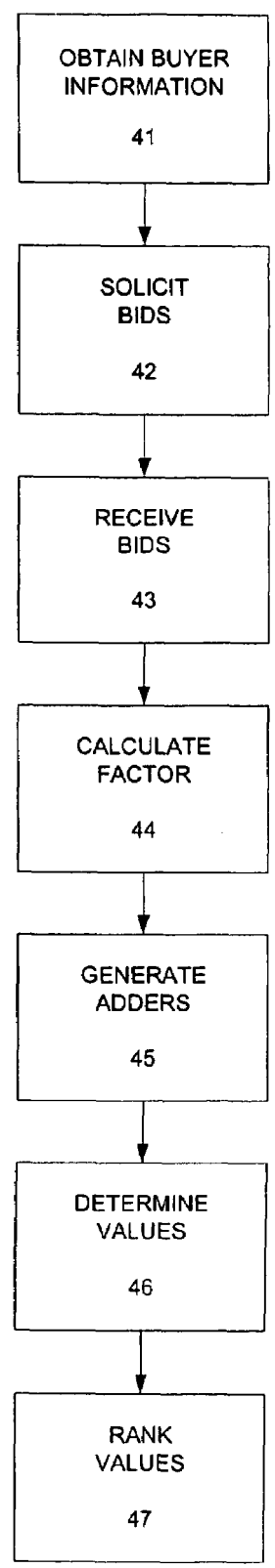
FIG. 3 is a block flow diagram of an embodiment of the method of the invention.

In one embodiment, as shown in FIG. 3, the auction coordinator 20 obtains buyer information, including an interest rate (i) and period (e) for a lot with a predetermined value (n), or price or annual spending amount, in step 41. The interest rate (i) is a cost of capital and is adjusted to the appropriate time period, and the period (e) may be a current payment period or a delivery period. At this time, the buyer may also identify goods or services to be purchased. The predetermined value (n) is fixed throughout the bidding and may be price or volume. The auction coordinator 20 then solicits bids on the lot of predetermined value (n) from bidders 30 in step 42. The bids are received by the auction coordinator 20 in step 43, where each bid has a payment time (p) and a rebate (x). Preferably, the payment time (p) is the number of days, or other units of time, such as months, years, etc., by which the buyer must pay the seller, or bidder 30, after receiving shipment or an invoice for the goods or services. The units of payment time (p) should correlate with the units on which the interest rate (i) is based. Rebates (x), or discounts, may be offered from the seller to the buyer based on volume, price, quantity, relationship, or any other factor. As the bidding by the bidders 30 proceeds, since the predetermined value (n) remains fixed, bidders 30 are competing on a combination of their allowed payment time (p) and their offered rebate (x).

A factor (m) is calculated from the interest rate (i) in step 44, in accordance with equation (1):

$$m = n/(1+i)^t \quad (1)$$

where t=time in which the rebate (x) will be paid. The value (n) may need to be converted to different time units, such as months, and the value (t) may be based on days, where t=360 days+days after the 360 days in which the rebate (x) will be paid. This calculation represents a calculation for a present value.

In step 45, an adder (b), or annual value, is generated for each bid in accordance with $$b = \frac{\sum_{q=1}^{g} b_q}{(1+i)^{(r+e)}} \quad (2)$$

wherein:

$$b_q = \frac{n/g * i * f}{(1+i)^{(z_q+f)}}, \quad (3)$$

q=1 to g time periods, g=number of time periods for which the buyer chooses to evaluate bids, r=total time units in a time period, f=(p−e), and $z_q$=total time units from 0 to q time periods. The variable f is a payment value defined in time and the sum ($z_q$+f) represents sequential period benefits, or extra time for payment, which may also be represented as extra $time_q$ or (total time units from 0 to q time periods+payment value). For example, q is 1 to 12 months if payment is due after each month, or a monthly invoice is received, r is 30 days in a month, f is in days, and z is number of days at the end of the month q, or 0 days for the first month (q=1), 30 days for the second month (q=2), and so on. If q is based on days, the other variables in the equation should also be based on days, and the adder (b) will be based on days.

In step 46, the bids are transformed into values (y), using equation (4):

$$y = (m*x) + b \quad (4)$$

In this linear function equation, m is fixed by the buyer and b is fixed by the seller. The values (y) may be calculated using any linear program that is well-known in the art. The values (y) that are calculated may be ranked in step 47 for display to the buyer.

In a first example of the embodiment, as shown below, the buyer annually spends $25,000,000 on a lot, or will pay a price (n) of $25,000,000, has an annual cost of capital (c) of 7.5%, and currently pays for the monthly portion of the supplied lot in fourteen (14) days after invoice (e). These values (n), (c), and (e), and therefore interest rate (i), are fixed by the buyer. For calculation purposes, the annual spending (n) is converted into a monthly spending (a) by dividing the annual spending (n) by 12 months (g). In this example, the interest rate (i) is based on days for calculation purposes, so (i) is calculated by dividing the annual cost of capital (c) by 360 days in a year. A bid submitted by a seller gives 21 days to pay (p) with a 0.3940% rebate (x). Since the bid has 7 extra payment days above the 14 days, the value (f) to the buyer is 7.

| Description | Variable | Value |
| --- | --- | --- |
| Annual Spend | n | 25,000,000 |
| Monthly Spend = (Annual Spend/12) (n/g) | a | 2,083,333 |
| Annual Cost of Capital | c | 7.50% |
| Daily Cost of Capital = (Annual Cost of Capital/360) | i | 0.000208333 |
| Payment Days | p | 21 |
| Value to Buyer = (Payment Days−14 (e)) | f | 7 |
| Rebate | x | 0.3940% |

To calculate the value (y), first, the value of the extended days, or adder (b), is calculated by adding the value per month ($b_q$) represented by Bill 1 through Bill 12, where q is 1 to 12 months, and dividing by $(1+i)^{(r+e)}$. In this case, r+e=30 days+14 days because accounting principles typically consider a "month" to be 30 days and 14 extra payment days are offered by the bidder. The annual value (y) using equation (2) is calculated to be $34,862.35.

|  | Bill 1 | Bill 2 | Bill 3 | Bill 12 |
| --- | --- | --- | --- | --- |
| Value of the Extended Days per Month ($b_q$) | 3,033.77 | 3,014.87 | 2,996.09 → | 2,832.22 |
|  | $\dfrac{(a) \times (i) \times (f)}{(1+i)^{(0+f)}}$ | $\dfrac{(a) \times (i) \times (f)}{(1+i)^{(30+f)}}$ | $\dfrac{(a) \times (i) \times (f)}{(1+i)^{(60+f)}}$ | $\dfrac{(a) \times (i) \times (f)}{(1+i)^{(330+f)}}$ |
| Sum of Monthly Benefit |  | 35,183.36 sum of Bill 1 to Bill 12 |  |  |
| Annual Value Discounted Back to January 1 (b) |  | 34,862.35 $\dfrac{\text{sum of Bill 1 to Bill 12}}{(1+i)^{44}}$ |  |  |

The discounted value of the rebate is calculated, based on the rebate being paid in 60 days from the end of the year, where 360+60=420, and the annual spend (n) converted from units of years to months (a), to be $90,248.38.

$$\text{Discounted Value of Rebate } (m*x) 90,248.38$$

$$\frac{(n) \times (x)}{(1+i)^{420}}$$

The total package present value (y) to buyer, according to equation (4), is $125,110.73.

In a second example of the embodiment, as shown below, the buyer annually spends $50,000,000 on a lot, has an annual cost of capital of 7.5% and currently pays within 14 days. A bid submitted by a seller gives 40 days to pay with a 0.2310% rebate (x). The extra days (f) are calculated to be 26 days.

| Description | Variable | Value |
| --- | --- | --- |
| Annual Spend | n | 50,000,000 |
| Monthly Spend = (Annual Spend/12) | a | 4,166,667 |
| Annual Cost of Capital | c | 7.50% |
| Daily Cost of Capital = (Annual Cost of Capital/360) | i | 0.000208333 |
| Payment Days | p | 40 |
| Value = (Payment Days (p)-14 (e)) | f | 26 |
| Rebate | x | 0.2310% |

The annual value (b) is calculated according to equation (2) to be $257,954.47.

days to pay, the calculated value (y) for that number of days may not be the most optimal value for the buyer.

TABLE 1

| | | Based on 7.5% cost of capital | |
| --- | --- | --- | --- |
| Annual Spend Volume | Client Held Days (p) | Bid Value of Rebate Available for different Hold Day Offereings (m*x) | Calculated Value to Customer (y) |
| $25,000,000.00 | 21 | 0.3940 | 125,110.73 |
| | 24 | 0.3245 | 124,101.18 |
| | 27 | 0.2950 | 132,235.25 |
| | 30 | 0.2389 | 134,257.79 |
| | 35 | 0.1989 | 149,841.88 |
| | 40 | 0.0909 | 149,798.50 |
| $50,000,000.00 | 21 | 0.3999 | 252,924.33 |
| | 24 | 0.3500 | 259,884.25 |
| | 27 | 0.3240 | 277,755.79 |
| | 30 | 0.2970 | 295,131.97 |
| | 35 | 0.2513 | 323,688.91 |
| | 40 | 0.2310 | 363,778.71 |

A computer software application may be used to manage the auction. Preferably, as shown in FIG. 6, the software application has two components: a client component 16 and a server component 23. The client component 16 may operate on a computer at the site of each of the potential suppliers 30. Suppliers 30 make bids during the auction using the client component 16. The bids may be sent via the network service provider 40 to the site of the coordinator, where it is received by the server component 23 of the software application. The client component 16 may include software used to make a

| | Bill 1 | Bill 2 | Bill 3 | Bill 12 |
| --- | --- | --- | --- | --- |
| Value of the Extended Days per Month ($b_q$) | 22,447.54 | 22,307.69 | 22,168.72 → | 20,956.27 |
| | $\frac{(a) \times (i) \times (f)}{(1+i)^{(0+f)}}$ | $\frac{(a) \times (i) \times (f)}{(1+i)^{(30+f)}}$ | $\frac{(a) \times (i) \times (f)}{(1+i)^{(60+f)}}$ | $\frac{(a) \times (i) \times (f)}{(1+i)^{(330+f)}}$ |
| Annual Value Discounted Back to January 1 (b) | | 257,954.47 | | |
| | | $\frac{\text{sum of Bill 1 to Bill 12}}{(1+i)^{44}}$ | | |

The discounted value based on the rebate (x), which will be paid 60 days after the year end, is $105,824.24.

$$\text{Discounted Value of Rebate } (m*x) 105,824.24$$

$$\frac{(n) \times (x)}{(1+i)^{420}}$$

Therefore, the value (y), according to equation (4), is $363,778.71.

The above examples, having different allowable days to pay (p), are shown in Table 1. In the first example, the buyer would likely choose 35 days to pay because the value (y) is the greatest. In the second example, the buyer would likely choose 40 days to pay because the value (y) is the greatest. Table 1 illustrates that even though a bidder may offer more connection through telephone lines or the Internet to the server component 23. Bids may be submitted over this connection and updates may be sent to the connected suppliers.

Bids may only be submitted using the client component 16 of the application. This ensures that buyers do not circumvent the bidding process, and that only invited suppliers participate in the bidding. Bidders may see their bids and bids placed by other suppliers for each lot on the client component 16. When a bidder submits a bid, that bid is sent to the server component 23 and evaluated to determine whether the bid is from an authorized bidder and whether the bid had exceeded a pre-determined maximum acceptable price. Bids placed by a supplier may be broadcast to all connected bidders, thereby enabling every participating bidder to quickly view the change in market conditions and begin planning their competitive responses.

The embodiments of the invention may be implemented by a processor-based computer system. The system includes a database for receiving and storing an interest rate and a period from a buyer for a plurality of lots and a plurality of bids on the lots from a plurality of bidders. The bids have a payment time and a rebate, and the lots have a predetermined value. The system further includes software for generating an adder and a factor for each bid, transforming the adders, factors and rebates into values, and optionally, comparing and ranking the values.

Figure 4:
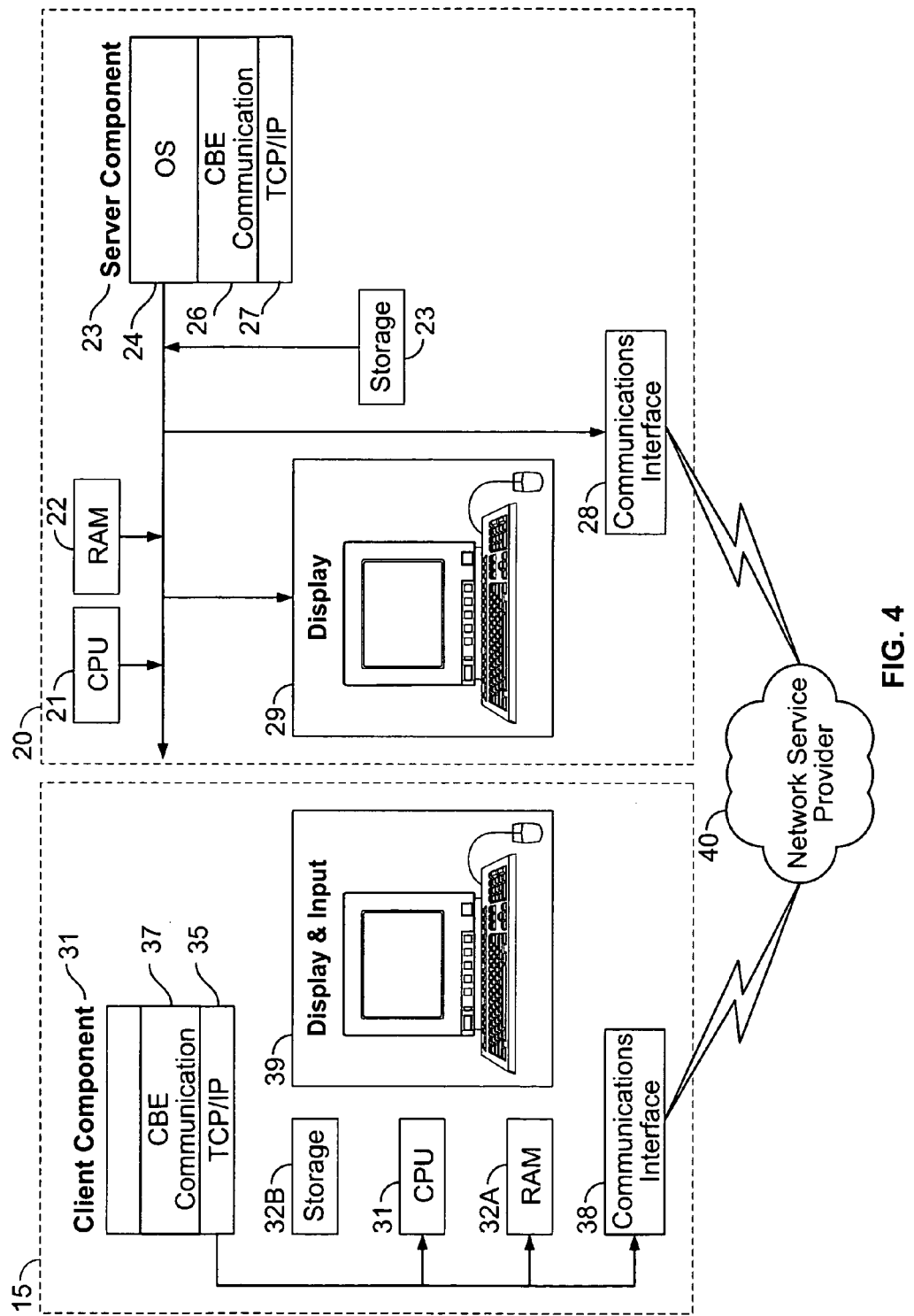
FIG. 4 is a schematic illustration of auction software and computers hosting that software in an auction.

With reference to FIG. 4, a computer system 20 operates to execute the functionality for server component 23. Computer system 20 includes a processor 21, a memory 22A and a disk storage 22B. Memory 22A stores computer program instructions and data. Processor 21 executes the program instructions or software, and processes the data, stored in memory 22A. Disk storage 22B stores data to be transferred to and from memory 22A. All these elements are interconnected by one or more buses, which allows data to be intercommunicated between the elements.

Processor 21 may be any type of processor capable of providing the speed and functionality required by the embodiments of the invention. For example, processor 21 could be a processor from a family of processors made by Intel Corporation or Motorola.

For purposes of this application, memory 22A and disk 22B are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system 20 may contain various combinations of machine readable storage devices, which are accessible by processor 21 and which are capable of storing a combination of computer program instructions and data.

Memory 22A is accessible by processor 21 over a bus and includes an operating system, a program partition and a data partition. The program partition stores and allows execution by processor 21 of program instructions that implement the functions of each respective system described herein. The data partition is accessible by processor 21 and stores data used during the execution of program instructions. For some embodiments of the invention, the program partition contains program instructions that performs the buy versus leasing transformation functionality described above.

Computer system 20 also includes input and output devices 29, such as a monitor, printer, mouse, and keyboard, and a network interface 28. Network interface 28 may be any suitable means for controlling communication signals between network devices using a desired set of communications protocols, services and operating procedures. Communication protocols are layered, which is also referred to as a protocol stack, as represented by operating system 24, a CBE-communication layer 26, and a Transport Control Protocol/Internet Protocol (TCP/IP) layer 27. Network interface 28 also includes connectors for connecting interface 28 with a suitable communications medium. Those skilled in the art will understand that network interface 28 may receive communication signals over any suitable medium such as twisted-pair wire, co-axial cable, fiber optics, radio-frequencies, and so forth.

FIG. 4 also shows a computer system 15 that operates to execute the functionality for client component 16. Computer system 15 includes a processor 31, a memory 32A, disk storage 32B, a communications interface 38, input and output devices 39, and a protocol stack having a CBE-communication layer 37 and a TCP/IP layer 35. These elements operate in a manner similar to the corresponding elements for computer system 20.

Another embodiment of the invention includes a machine readable medium for evaluating values of different terms in online auctions. The machine readable medium includes a first machine readable code that receives and stores an interest rate and a period from a buyer for lots, where each lot has a predetermined value, and a second machine readable code that receives bids from bidders. The bids have a payment time and a rebate. The machine readable medium further includes a third readable code that generates an adder and a factor for each bid and a fourth readable code that transforms the adders, factors and rebates into values. In addition, a fifth readable code that compares and ranks the values may be included.

While the invention has been described in detail and with reference to specific embodiments thereof, it will be apparent to one skilled in the art that various changes and modifications can be made therein without departing from the spirit and scope thereof. For example, the invention may be used in a downward auction. Thus, it is intended that the present invention covers the modifications and variations of this invention provided they come within the scope of the appended claims and their equivalents.

What is claimed is:

1. A computer implemented method of evaluating values of different terms in online auctions comprising:

obtaining an interest rate and a period from a buyer for a lot, the lot having a predetermined value;

receiving a first bid from a first bidder and a second bid from a second bidder on the lot, the first and second bids each having a payment time and a rebate;

transforming the first bid into a first value and the second bid into a second value using the interest rate, period, and predetermined value from the buyer and the payment times and rebates from the first and second bidders; and providing as output the first and second value to allow the first value to be compared with the second value to choose the best bid for a particular situation;

wherein the transforming comprises:

determining a factor from the interest rate and the period; and generating a first and second adder from the first and second payment times, respectively, the interest rate, the period, and the predetermined value; and wherein the generating comprises:
  calculating the adder (b) according to equations (2) and (3):

$$b = \frac{\sum_{q=1}^{g} b_q}{(1 + \text{interest rate})^{(\text{total time units in a time period}+\text{period})}} \quad (2)$$

$$b_q = \frac{(\text{predetermined value}/\text{total time periods}) * \text{interest rate} * \text{payment value}}{(1 + \text{interest rate})^{\text{extra time}_q}} \quad (3)$$

wherein:
  q=1 to total time periods;
  payment value=payment time−period; and
  extra time$_q$=total time units from 0 to q time periods+ payment value.

2. The method of claim 1 wherein the calculating comprises:
  providing the extra time, the time units, the payment time, and the period based on days; and
  determining the interest rate per day.

3. The method of claim 1 further comprising comparing the first value and the second value.

4. The method of claim 1 further comprising displaying a rank of the first value with respect to the second value.

5. The method of claim 1 further comprising soliciting potential bidders.

6. The method of claim 5 wherein soliciting comprises:
  preparing a request for quotation;
  providing the request for quotation to the potential bidders; and
  requesting the potential bidders to respond to the request for quotation.

7. The method of claim 1 further comprising conducting the auction as a reverse auction.

8. The method of claim 1 further comprising conducting the auction as a forward auction.

9. The method of claim 1 further comprising:
  electronically coupling the first and second bidders to an auction coordinator; and
  submitting the first and second bids to the auction coordinator online.

10. The method of claim 1 wherein the obtaining comprises: identifying at least one of goods and services to be purchased.

11. The method of claim 1 further comprising:
  receiving at least one additional bid having an additional time period and an additional rebate; and
  transforming the additional rebate into an additional value.

12. A method of evaluating values of different terms in online auctions comprising:
  obtaining an interest rate (i) and payment period (e) from a buyer for a plurality of lots, each lot having a price (n);
  receiving a plurality of bids from a plurality of bidders, each bid having a payment time (p) and a rebate (x);
  generating an adder (b) and a factor (m) for each bid;
  transforming the adders (b), factors (m), and rebates (x) into values (y);
  ranking the values (y); and
  providing as output the ranking to allow for the selection of the best bid for a particular situation;

wherein the generating comprises:
  calculating the adder (b) according the equations (2) and (3):

$$b = \frac{\sum_{q=1}^{g} b_q}{(1 + i)^{(r+e)}} \quad (2)$$

$$b_q = \frac{n/g * i * f}{(1 + i)^{(z_q+f)}}, \quad (3)$$

wherein:
  q=1 to g time periods,
  g=number of time periods,
  r=total time units in a time period,
  f=(p−e), and
  $z_q$=total time units from 0 to q.

13. A method of evaluating values of different terms in online auctions comprising:
  obtaining an interest rate (i) and payment period (e) from a buyer for a lot, the lot having a price (n);
  soliciting a plurality of bids from a plurality of bidders;
  receiving the bids from the bidders, each bid having a payment time (p) and a rebate (x);
  calculating a factor (m) according to equation (1):

$$m=n/(1+i)^t \quad (1)$$

wherein:
  t=time in which the rebate (x) will be paid;
  generating adders (b) for each bid according to equations (2) and (3):

$$b = \frac{\sum_{q=1}^{g} b_q}{(1 + i)^{(r+e)}} \quad (2)$$

$$b_q = \frac{n/g * i * f}{(1 + i)^{(z_q+f)}}, \quad (3)$$

wherein:
  q=1 to g time periods,
  g=number of time periods,
  r=total time units in a time period,
  f=(p−e), and
  $z_q$=total time units from 0 to q;
  determining the values (y) according to equation (4):

$$y=(m*x)+b; \quad (4)$$

ranking the values (y); and
  providing as output the ranking to allow for the selection of the best bid for a particular situation.

14. A system for evaluating values of different terms in online auctions comprising:
  a database for receiving and storing an interest rate and a period from a buyer for a plurality of lots and a plurality of bids on the lots from a plurality of bidders, each bid having a payment time and a rebate, the lots having a predetermined value; and
  a processor configured to:
  generate an adder and a factor for each bid and transform the adders, factors and rebates into values; and
  provide output to allow for the selection of the best bid for a particular situation;

wherein the adder (b) is calculated according to equations (2) and (3):

$$b = \frac{\sum_{q=1}^{g} b_q}{(1 + \text{interest rate})^{(\text{total time units in a time peirod} + \text{payment period})}} \quad (2)$$

$$b_q = \frac{(\text{predetermined value}/12) * \text{interest rate} * \text{payment value}}{(1 + \text{interest rate})^{\text{extra time}_q}} \quad (3)$$

wherein:
  q=1 to 12 months,
  payment value=payment time−period, and
  extra time$_q$=total time in days from 0 to q months+payment value.

15. The system of claim 14 wherein the interest rate is calculated per day.

16. The system of claim 14 wherein the period is determined in days.

17. The system of claim 14 wherein the payment time is provided in days.

18. The system of claim 14 wherein the software compares and ranks the values.

19. A computer program product for evaluating values of different terms in online auctions, the computer program product being embodied in a computer readable storage medium and comprising computer instructions which, when executed, cause a computer to:
  receive and store an interest rate and a period from a buyer for lots, each lot having a predetermined value;
  receive bids from bidders, each bid having a payment time and a rebate;
  generate an adder and a factor for each bid; and
  transform the adders, factors and rebates into values;
  wherein the adder (b) is calculated according to equations (2) and (3):

$$b = \frac{\sum_{q=1}^{g} b_q}{(1 + \text{interest rate})^{(\text{total time units in a time peirod} + \text{payment period})}} \quad (2)$$

$$b_q = \frac{(\text{predetermined value}/12) * \text{interest rate} * \text{payment value}}{(1 + \text{interest rate})^{\text{extra time}_q}} \quad (3)$$

wherein:
  q=1 to 12 months,
  payment value=payment time−period, and
  extra time$_q$=total time in days from 0 to q months+payment value.

* * * * *

UNITED STATES PATENT AND TRADEMARK OFFICE
CERTIFICATE OF CORRECTION

PATENT NO. : 7,483,852 B2  
APPLICATION NO. : 10/131326  
DATED : January 27, 2009  
INVENTOR(S) : Marhafer et al.

It is certified that error appears in the above-identified patent and that said Letters Patent is hereby corrected as shown below:

Claim 19

Column 14, line 15 delete

"$$b = \frac{\sum_{q=1}^{g} b_q}{(1 + \text{interest rate})^{(\text{total time units in a time period} + \text{period})}}$$" and insert -- $$b = \frac{\sum_{q=1}^{g} b_q}{(1 + \text{interest rate})^{(30 + \text{period})}}$$ --

Signed and Sealed this

Twenty-seventh Day of October, 2009

David J. Kappos  
*Director of the United States Patent and Trademark Office*